(12) United States Patent
Aleksandrovsky (10) Patent No.: US 10,311,476 B2
(45) Date of Patent: Jun. 4, 2019

(54) RECOMMENDING MAGAZINES TO USERS OF A DIGITAL MAGAZINE SERVER

(71) Applicant: Flipboard, Inc., Palo Alto, CA (US)

(72) Inventor: Boris Lev Aleksandrovsky, Berkeley, CA (US)

(73) Assignee: Flipboard, Inc., Palo Alto, CA (US)

( * ) Notice: Subject to any disclaimer, the term of this patent is extended or adjusted under 35 U.S.C. 154(b) by 641 days.

(21) Appl. No.: 14/164,089

(22) Filed: Jan. 24, 2014

(65) Prior Publication Data
US 2015/0213492 A1 Jul. 30, 2015

(51) Int. Cl.
*G06F 16/335* (2019.01)
*G06F 16/435* (2019.01)
*G06Q 30/02* (2012.01)
*G06F 16/332* (2019.01)
*G06F 16/35* (2019.01)

(52) U.S. Cl.
CPC ....... *G06Q 30/0255* (2013.01); *G06F 16/335* (2019.01); *G06F 16/3322* (2019.01); *G06F 16/355* (2019.01); *G06F 16/435* (2019.01)

(58) Field of Classification Search
CPC ........ G06F 17/30616; G06F 17/30598; G06F 17/30601; G06F 17/30705; G06F 17/30713; G06Q 30/0255
USPC ......... 707/748, 706, 749, E17.009, E17.002, 707/E17.003, E17.005, 736, 778, 723
See application file for complete search history.

(56) References Cited

U.S. PATENT DOCUMENTS

| | | | | |
|---|---|---|---|---|
| 8,554,640 B1 * | 10/2013 | Dykstra | ............... | G06Q 10/101 705/14.49 |
| 9,153,141 B1 * | 10/2015 | Kane, Jr. | ................. | G09B 7/00 |
| 9,374,411 B1 * | 6/2016 | Goetz | ..................... | H04L 67/02 |
| 9,430,779 B1 * | 8/2016 | Mhatre | .............. | G06Q 30/0251 |
| 2008/0027979 A1 * | 1/2008 | Chandrasekar | ... | G06F 17/30663 |
| 2009/0119234 A1 * | 5/2009 | Pinckney | ............. | G06N 99/005 706/12 |
| 2011/0184899 A1 * | 7/2011 | Gadanho | ................ | G06Q 30/02 706/46 |
| 2012/0124130 A1 * | 5/2012 | Coates | .............. | G06F 17/30867 709/203 |

(Continued)

OTHER PUBLICATIONS

Chu et al, "Personalized Recommendation on Dynamic Content Using Predictive Bilinear Models", WWW 2009, Apr. 20-24, 2009, Madrid, Spain, pp. 691-700.*

*Primary Examiner* — Jeff A Burke
*Assistant Examiner* — Kamal K Dewan
(74) *Attorney, Agent, or Firm* — Fenwick & West LLP (57) ABSTRACT

A digital magazine server identifies content items for recommendation to a user based on content items with which the user previously interacted. Based on key phrases and terms in content items with which the user previously interacted, topics are associated with the content items and used to generate a vector for each content item. The vectors are used to generate clusters including one or more content items. A characteristic vector is generated for each cluster based on the vectors generated for content items within a cluster. Candidate content items are retrieved and topics included in the candidate content items are used along with the characteristic vectors to determine a measure of similarity between candidate content items and various clusters. Candidate content items with at least a threshold measure of similarity to a cluster are selected for presentation to the user.

17 Claims, 4 Drawing Sheets

(56) References Cited

U.S. PATENT DOCUMENTS

| | | | | |
|---|---|---|---|---|
| 2012/0254188 A1* | 10/2012 | Koperski | G06F 17/30663 | 707/740 |
| 2013/0061256 A1* | 3/2013 | Whinmill | H04H 60/33 | 725/9 |
| 2014/0013353 A1* | 1/2014 | Mathur | G06F 17/30867 | 725/34 |
| 2014/0033007 A1* | 1/2014 | Mhatre | G06F 17/214 | 715/205 |
| 2014/0122456 A1* | 5/2014 | Dies | G06F 17/30707 | 707/706 |
| 2014/0180991 A1* | 6/2014 | Cudak | G06Q 30/0264 | 706/46 |
| 2014/0379707 A1* | 12/2014 | Givoni | G06F 17/30014 | 707/726 |
| 2015/0073931 A1* | 3/2015 | Ronen | G06Q 30/0631 | 705/26.7 |

* cited by examiner

RECOMMENDING MAGAZINES TO USERS OF A DIGITAL MAGAZINE SERVER

BACKGROUND

This invention generally relates to recommending content to a user of a digital magazine server, and more specifically to recommending content to a user based on content with which a user previously interacted.

An increasing amount of content is provided to users through digital distribution channels. While this allows users to more easily access a range of content, the increased amount of available content often makes it difficult for a user to identify content most likely to be of interest to the user. Various techniques to recommend content to users based on the user's interactions with content presented by an online system, such as a website or a social networking system. However, the large volume of content items maintained by various online systems makes it challenging for an online system to identify content items to analyze for recommendation to a user and to recommend content items to the user.

SUMMARY

A digital magazine server retrieves content from one or more sources and generates a personalized, customizable digital magazine for a user based on the retrieved content. The digital magazine server monitors the behavior of users with respect to content items presented to the user to determine connections between the user and one or more content items or between a content item and one or more other content items. In one embodiment, the digital magazine server identifies and retrieves content items with which the user previously interacted. Key phrases or terms are identified from the retrieved content item, and one or more topics are associated with each content items based on key phrases or terms identified in a content item. Based at least in part on the topics associated with various content items, a vector is generated for each content item. For example, a vector associated with a content item has one or more dimensions that each has a value based at least in part on a number of times a topic is associated with the content item. A vector generated for a content item represents user interests included in the content item. One or more clusters that each includes at least one content item are generated based on the generated vectors. Thus, the clusters represent various combinations of topics or interests associated with a user. In one embodiment, the number of clusters generated may be controlled by the user.

The digital magazine server generates a characteristic vector for one or more clusters. A characteristic vector represents a combination of topics or user interests associated with content items included in a cluster. A candidate content item for presentation to the user is retrieved and a measure of similarity between the candidate content item and one or more of the characteristic vectors is determined. For example, topics associated with the candidate content item are identified based on key phrases or terms in the candidate content item and used to generate a vector associated with the candidate content item. The vector generated for the candidate content item is compared to various characteristic vectors, and content items included in one or more clusters having a characteristic vector with at least a threshold similarity to the vector generated for the candidate content items are selected for presentation to the user.

The features and advantages described in this summary and the following detailed description are not all inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
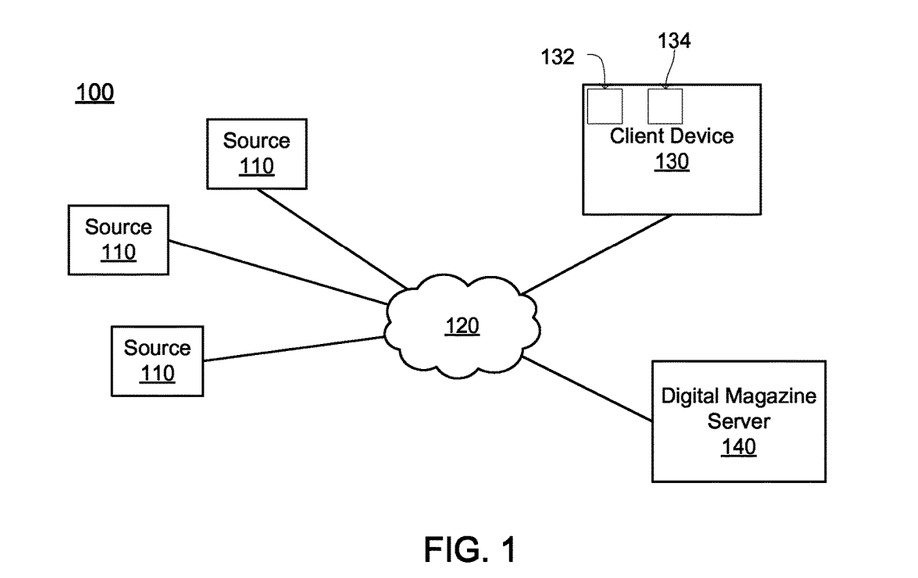
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 1120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 110 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 1130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
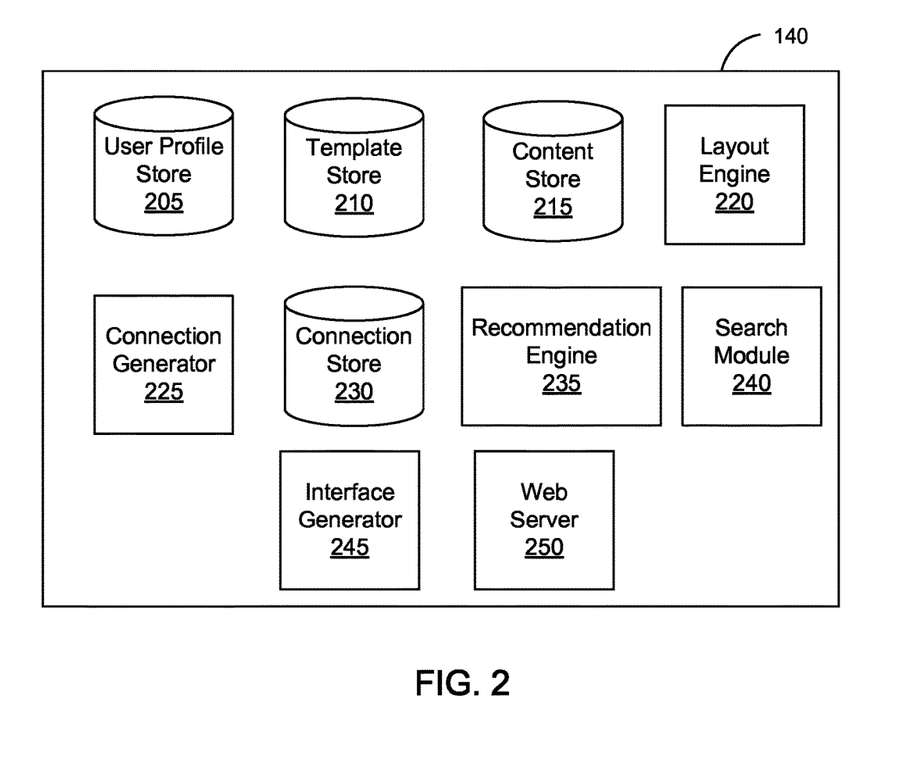
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred. Content items a user previously interacted with may be retrieved by the digital magazine server 140 using the content item identifiers in the user's user profile, allowing the digital magazine server 140 to recommend content items to the user based on content items with which the user previously interacted.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section. In one embodiment, the content store 215 includes information identifying candidate content items for recommendation to a user. The content store 215 may also store characteristic vectors representing a combination of interests for a user or clusters of interests or content items for a user determined by the recommendation engine 235.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187, 840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230 and generates a list of content items to recommend to the user. In one embodiment, the recommendation engine 235 also generates one or more characteristic vectors associated with a user to store in the content store 215, as further described below in conjunction with FIG. 4. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS® or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, content items may be recommended to the user by a digital magazine application executing on the client device 130, allowing content items to be recommended to the user by the client device 130. Alternatively, information identifying content items with which a user previously interacted is communicated from a client device 130 to the digital magazine server 140, which identifies content items to recommend to the user based at least in part on the identified content items and communicates one or more of the recommended content items to the client device 130.

Page Templates

Figure 3:
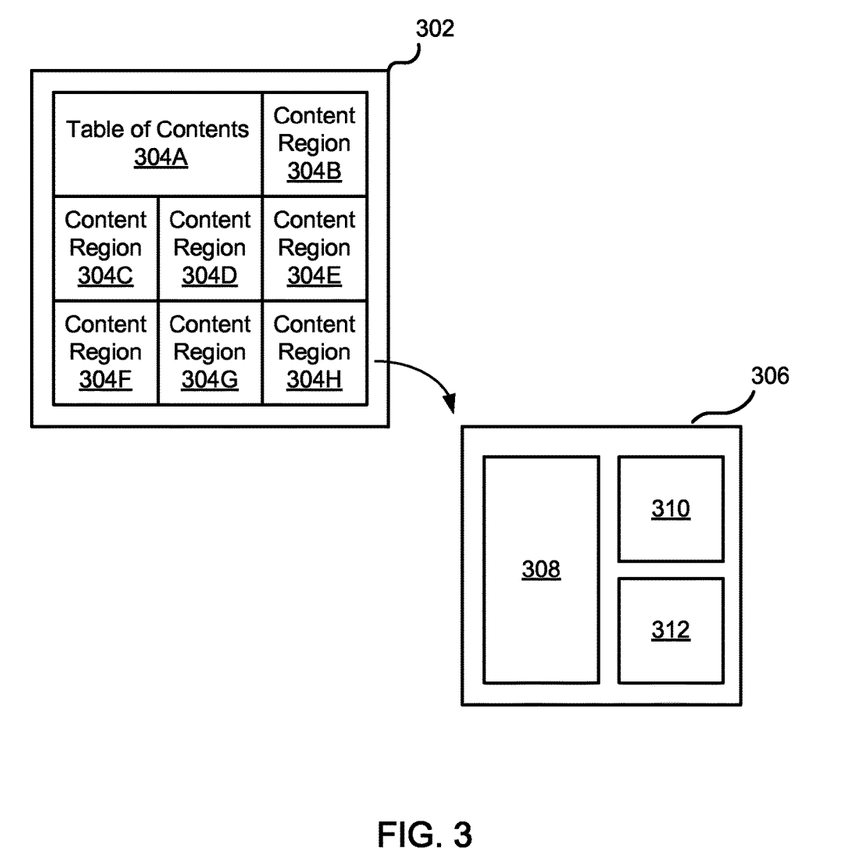
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Recommending Content Items to a Digital Magazine Server User

Figure 4:
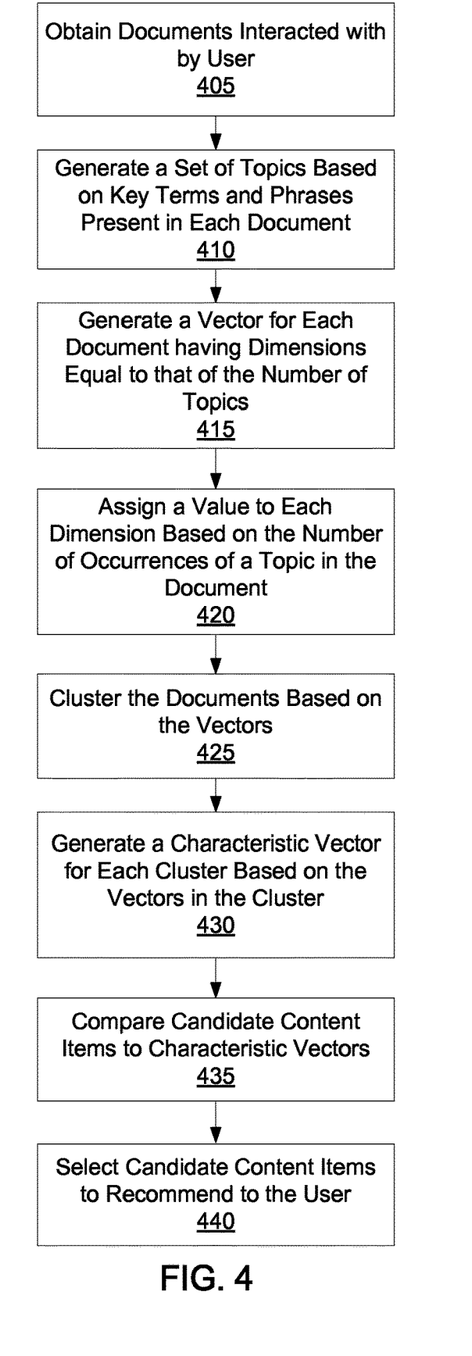
FIG. 4 shows a flow chart of one embodiment of a method for recommending content items to a digital magazine server user.

FIG. 4 shows a flow chart of one embodiment of a method for recommending content items to a digital magazine server user. In one embodiment, the functionality described in conjunction with FIG. 4 is provided performed by the recommendation engine 235; however, in other embodiment, any suitable component or combination of components may provide the functionality described in conjunction with FIG. 4. Additionally, in some embodiments, 2 different and/or additional steps than those identified in FIG. 4 may be performed or the steps identified in FIG. 4 may be performed in different orders.

In one embodiment, the recommendation engine 235 obtains 405 content items previously interacted with by a user, based on information retrieved from the user profile store 205, the connection store 230 and the content store 215. For example, the recommendation engine 235 identifies connection information between a user and various content items from the connection store 230. In one embodiment, the digital magazine server 140 determines content items to obtain 405 based at least in part on the number of connections between a user and a content item and/or the number of connections between the content item and other content items with which the user interacted. For example, content items having at least a threshold number of connections with the user are identified. In another example, content items having at least a threshold number of connections between the content item and a content item with which the user interacted within a threshold time interval from the current time are identified. The content item identifiers associated with the identified content items are retrieved from the content store 215 to obtain 405 content items with which the user interacted from the content store 215. In one embodiment, the recommendation engine 235 identifies content items to obtain 405 from the content store 215 over a sliding time window determined based on one or more criteria. For example, the duration of the sliding time window is determined based at least in part on a type of content item with which the user interacted or the number of content items of a specific type present in the content store 215. Using a sliding time window allows the digital magazine server 140 to obtain 405 content items based on user interactions more relevant to a time when the content items are obtained 405. For example, the recommendation engine 235 identifies news articles to obtain 405 using a time window less than a threshold duration (e.g., 24 hours), as a news article may be relevant to a user for a short period of time. Similarly, the recommendation engine 235 may use a time window having a relatively longer duration (e.g., two weeks) to identify sections of the digital magazine to obtain 405, as the relevance of a section to the user may attenuate less rapidly.

Based on key terms and/or phrases in each of the obtained content items, the digital magazine server 1404 generates 410 a set of topics. For example, the recommendation engine 235 identifies specific key terms and phrases from each content item that represent topics or subjects described by various content items. Based on the key terms or phrases from the obtained content items, 24a set of topics representing the user's areas of interest is generated 410. This allows the digital magazine server 140 to determine topics of interest to the user based on content items with which the user previously interacted.

In one embodiment, the topics generated 410 are based on at least in part, the weight associated with each key term or phrase found. The weights associated with a key term or phrase may be determined in a variety of ways. For example, weights associated with a key term or phrase may be based on at least in part the location (the title, body, caption, etc) of the key term or phrase in a content item. In one embodiment, a key term or phrase found the title of a content item receives a higher weight than a key term or phrase found in the body of a content item. In one embodiment, weights associated with a key term or phrase are based at least in part on a format with which the key term or phrase is presented to the user (e.g., in bold, a specific color, etc) to a user. For example, key phrase or term that presented in a red colored font or in a bold font receives a higher weight than a key phrase or term presented in plain text. In another embodiment, a weight associated with a key term or phrase in a content item is based at least in part on a relationship between the key term or phrase and other key terms or phrases in the content item. For example, the name of an individual in a content item related to a specific sport receives a higher weight than other key terms or phrases related to the sport included in the content item. In some embodiments, a weight associated with a key term or phrase may be based at least in part on a number of occurrences of the key term or phrase in the content item. For example, a phrase's weight is proportional to the number of times the phrase appears in a content item.

Using the topics generated 410 from the content items, a vector is generated 415 for one or more content items. In one embodiment, the dimensions of the vector equal the number of generated topics. Generating a vector for a content item simplifies application of one or more analytical techniques to various content items based on topics included in the content items.

In one embodiment, a value is assigned 420 to each dimension of a vector generated for a content item based on the number of times a topic occurs in the content item. Various methods may be used by the recommendation engine 235 to determine the value assigned 420 to each dimension of a content item's vector. In one embodiment, a binary value is assigned 420 to various dimensions of a vector generated for a content item. For example, if a dimension corresponds to a topic included in the content item or to a topic that occurs at least a threshold number of times in the content item, the value assigned 420 to the dimension is one; however, if a dimension corresponds to a topic that is not included in the content item or that occurs less than a threshold number of times in the content item, the dimension assigned 420 to the dimension is zero. In the preceding example, the value of each dimension of the vector for the content item indicates whether the topic associated with a dimension is included in the content item. As another example, the value assigned 420 to a dimension of a vector for a content item is a count of the number of occurrences of a topic corresponding to the dimension in the content item. In this example, the value of a dimension of the vector represents the prevalence of a topic corresponding to the dimension in the content item. In an additional example, the value assigned 420 to a dimension of a vector for a content item increases at a rate that decreases as the number of occurrences of the topic in a document increases, so the value of a dimension is weighted by the prevalence of a topic associated with the dimension in the content item for which the vector was generated 410.

Based at least in part on the vectors representing various content items, the content items are then clustered 425, which allows different clusters of content items to represent different combinations of user interests. In one embodiment, K-means clustering is used to cluster the content items based on the vectors representing the various content items. Using K-means clustering causes a content item to be clustered based on the distance of each dimension of a vector representing the content item to a mean value associated with a dimension across all vectors. For example, content items having a value associated with a dimension that is within a specified distance to a mean value associated with the dimension are included in a cluster. Using the vectors for various documents in a cluster, the recommendation engine 235 generates 430 a characteristic vector for various clusters. For example, a characteristic vector is generated 430 for each cluster based on the vectors corresponding to each content item in a cluster. A characteristic vector represents a combination of interests to the user included in a cluster. In one embodiment, various characteristic vectors are stored and associated with a user profile, allowing the digital magazine server 140 to more efficiently retrieve information describing a user's interests.

In one embodiment, weights are associated with dimensions of each vector for a content item, and these weights are used when generating 430 a characteristic vector for a cluster including the vector. For example, a weight associated with a vector's dimension is based on a type of the content item from which the vector was generated 415. For example, a topic represented by a dimension is given a relatively higher weight if the content item is an image than if the content item is a blog. In this example, associating a higher weight to a dimension if a content item is an image increases the contribution of a topic associated with the dimension of the content item to a cluster relative to the contribution of the topic associated with the dimension of a content item that is a blog. Hence, the characteristic vector of the clusters in this example would represent a combination of user interests biased towards one or more topics associated with images rather than topics associated with blogs. In another example, a weight associated with a vector's dimension is based on a relationship between the value of the dimension and a threshold value that is based on the type of content item or based on the content of the content item. As a specific example, a news article on football includes a player's name and multiple mentions of the word "football," and the value assigned 420 to each dimension of a vector for the news article is4 a count of the number of times a topic occurs in the news article. By differently weighting the topics of "football" and the player's name based on whether the value of each dimension is above or below a threshold value, 2 two characteristic vectors for different clusters of content items, one representing a cluster of content items related to football and the football player and the other representing a cluster of content items related to football but not the football player may be generated 430.

One or more candidate content items for presentation to the user are identified from the content store 215 or are received from a source 110. As described above, a vector is generated for a candidate content item by identifying topics based on key phrases or terms in the candidate content item and generating the vector based on the topics; various dimensions of the vector may represent one or more topics present in the candidate content item. The vectors representing the candidate content items are compared 435 to one or more characteristic vectors. For example, a vector is generated for a candidate content item, and the candidate content item's vector is compared to each characteristic vector associated with the user. In one embodiment, scores representing the similarity between vectors generated for candidate content items and one or more of the characteristic vectors associated with the user are generated and used to rank the candidate content items. In one embodiment, the candidate content item is obtained from a list of candidate content items in the content store 215 for recommendation to various digital magazine server users. In other embodiments, the candidate content item may be obtained from a source 110 identified or based on connections between various content items and content items with which the user previously interacted.

Various methods may be used to compare 435 a candidate content item with characteristic vectors. For example, cosine similarities between the vector generated from the candidate content item and various characteristic vectors are determined or cosine similarities between the vector generated from the candidate content item and the centroids of various clusters are determined. However, any suitable technique may be used to compare 435 candidate content items with characteristic vectors, determining a measure of similarity between the candidate content item and the characteristics vectors of various clusters.

Based on the comparison between one or more candidate content items and one or more characteristic vectors, one or more candidate content items for recommendation to the user are selected 440, Various methods may be used to select 440 a candidate content item for recommendation to the user. In one embodiment, a candidate content item is initially scored. For example the score associated with each content item is based on at least in part the relationship between the topics in the candidate content item and the characteristic vector of each cluster. Hence, candidate content items having vectors that identify topics matching or similar to topics in a characteristic vector have a higher score than candidate content items having vectors that do not identify topics matching or similar to topics identified by a characteristic vector. In another example, the score associated with each content item is based at least in part on the content type of the candidate content item and the characteristic vector of each cluster. For example, the content type of the candidate content item is compared to the content type of content items in a cluster, and the score of the candidate content item is increased if its content type matches a content type of at least a threshold number of content items in a cluster. In one embodiment, the recommendation engine 235 ranks the candidate content items based on the score associated with a content item and selects content items having at least a threshold position in the ranking. The selected content items may be identified to the user or one or more of the selected content items are presented to the user. Alternatively, the recommendation engine 235 selects one or more candidate content items for presentation to the user that have at least a threshold similarity to a characteristic vector associated with a user.

While FIG. 4 describes generation of vectors for content items and characteristic vectors describing clusters of content items, in other embodiments, any suitable representation of content items generated and characteristic representations for clusters of content items generated from the representations of content items in a cluster. A representation of a content item includes various dimensions based on topics identified from the content item. As described above, a value of a dimension may be based on a number of times a topic associated with the dimension occurs in the content item. Hence, in various embodiments, different representations of a content item based on topics included in the content item may be used to perform the functionality described above in conjunction with FIG. 4.

Figure 5:
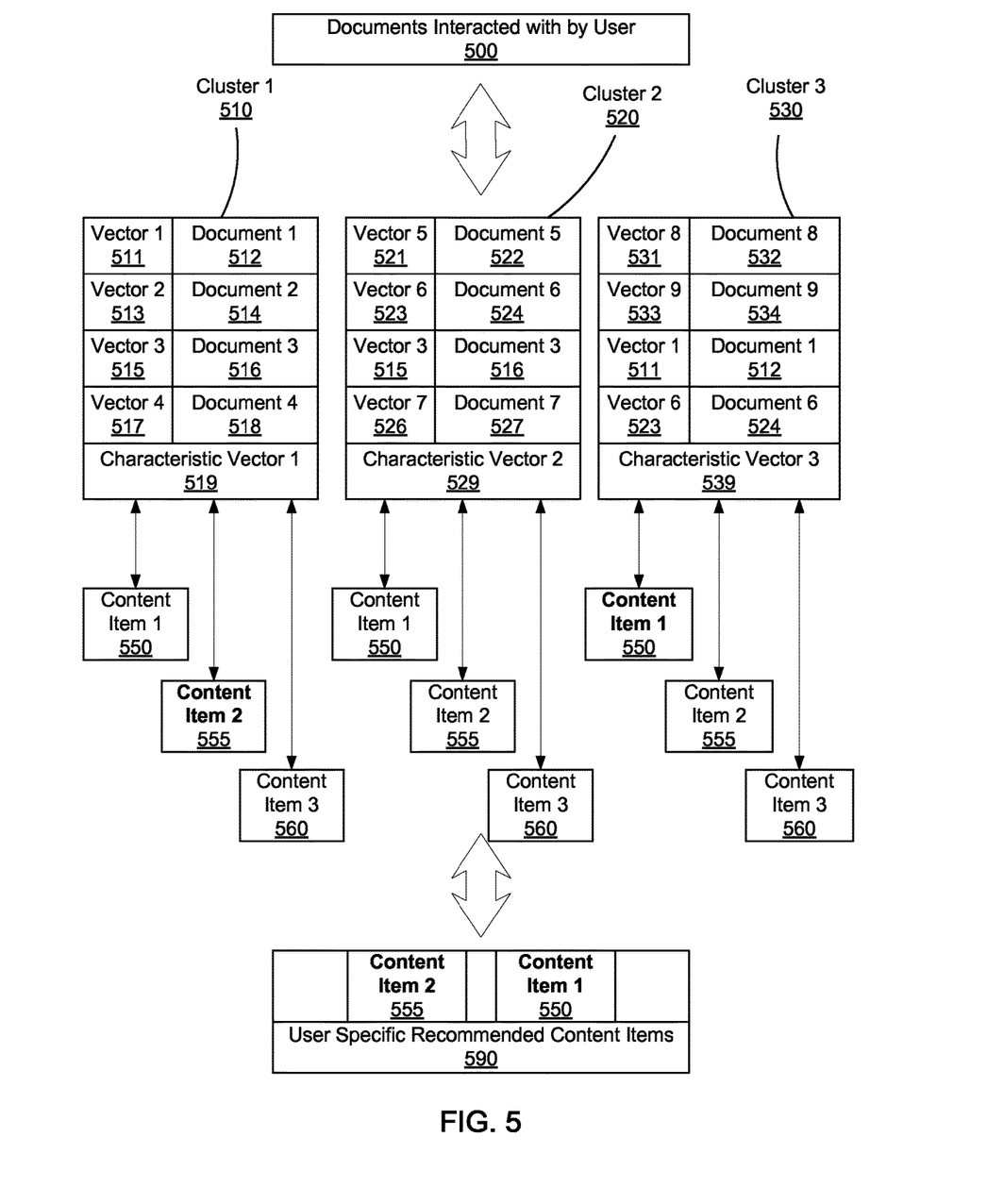
FIG. 5 is a process flow diagram illustrating selection of content items for recommendation to a user of a digital magazine server.

FIG. 5 is a process flow diagram illustrating selection of content items for recommendation to a user of a digital magazine server 140. Content items with which a user previously interacted 500 are obtained 405 from the content store 215. In one embodiment, the recommendation engine 235 identifies key terms or phrases from each of the content items with which the user previously interacted 500. Based on the identified key terms or phrases, a set of topics representing user interests is generated and a vector for each content item with which the user previously interacted is generated 415 based on the set of topics. For example, cluster 1 510 includes document 1 512, document 2 514, document 3 516, and document 4 518 which are associated with vector 1 511, vector 2 513, vector 3 515, and vector 4 517, respectively. Cluster 2 520 includes document 5 522, document 6 524 document 3 516, and document 7 527, which are associated with vector 5 521, vector 6 523, vector 3 515 and vector 7 526, respectively. Cluster 3 530 includes document 8 532, document 9 534, document 1 512, and document 6 524 which are associated with vector 8 531, vector 9 533, vector 1 511, and vector 6 523, respectively.

As described above in conjunction with FIG. 4, content items with which a user previously interacted 500 are clustered 425 into cluster 1 510, cluster 2 520, and cluster 3 530, based on the vectors generated for the content items with which the user previously interacted 500. For example, document 1 512 and document 4 518 both belong to cluster 1 510 based on their representative vectors vector 1 511 and vector 4 517 respectively. As content items are clustered 425 based on their representative vectors, a content item may be included in multiple clusters. For example, document 3 516 belongs to both cluster 1 510 and cluster 2 520, which shows that clusters represent a combination of user interests.

In FIG. 5, cluster 1 510, cluster 2 520, and cluster 3 530 are represented by characteristic vector 1 519, characteristic vector 2 529, and characteristic vector 3 539 respectively. As described above in conjunction with FIG. 4, a characteristic vector for a cluster is generated 430 based on vectors corresponding to content items included in a cluster. Each characteristic vector represents a combination of user interests included in a cluster.

Candidate content item 1 550, candidate content item 2 555, and candidate content item 3 560 are compared 435 to each characteristic vector to identify one or more content items for recommending to the user. In the example of FIG. 5, topics represented by content item 2 555 are determined to have at least a threshold similarity to user interests represented by the characteristic vector 1 519 and topics represented by content item 1 550 are determined to have at least the threshold similarity to user interests represented by characteristic vector 3 539. Hence, the recommendation engine 235 selects 440 content item 1 550 and content item 2 555 as content items recommended to the user 590.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for recommending content items to a user of a digital magazine server, the method comprising:
    identifying a specific type of content item for recommending to the user of the digital magazine server;
    determining a time window corresponding to the identified specific type of content item, the duration of the time window determined based on a number of content items having the specific type included in a content store of the digital magazine server, different types of content item corresponding to time windows having different durations;
    identifying a plurality of content items with which the user of the digital magazine server previously interacted during the determined time window corresponding to the identified specific type of content item;
    identifying key terms from each of the plurality of content items;
    generating one or more topics associated with each content item based at least in part on the identified key terms and characteristics describing frequency of presentation of each of the identified key terms in each content item and describing differences in presentation of each of the identified key terms by each content item relative to presentation of other terms in each content item;
    generating a vector for each content item based at least in part on one or more topics associated with a content item, the vector having one or more dimensions with a value of a dimension based at least in part on a number of times a topic occurs in the content item;
    generating one or more clusters each including one or more content items based at least in part on the generated vectors;
    determining characteristic vectors for each cluster based at least in part on the generated vectors, a characteristic vector for a cluster based at least in part on one or more of the generated vectors included in the cluster;
    retrieving a candidate content item having the specific type;
    determining a measure of similarity between the candidate content item and one or more of the characteristic vectors; and
    selecting the candidate content item for recommendation to the user based at least in part on the determined measures of similarity.

2. The computer-implemented method of claim 1, wherein identifying the plurality of content items with which the user of the digital magazine server previously interacted comprises:
    identifying a plurality of content items having at least a threshold number of connections to the user of the digital magazine server user via the digital magazine server.

3. The computer-implemented method of claim 1, wherein identifying the plurality of content items with which the user of the digital magazine server previously interacted comprises:
    identifying a plurality of content items having at least a threshold number of connections to additional content items with which the user of the digital magazine server previously interacted.

4. The computer-implemented method of claim 1, wherein generating the vector for each content item based on one or more topics associated with the content item comprises:
    associating a weight with one or more dimensions of the vector based at least in part on a type of the content item for which the vector was generated.

5. The computer-implemented method of claim 1, wherein determining characteristic vectors for each cluster based at least in part on the generated vectors comprises:
    determining values associated with one or more dimensions of each vector generated for content items in a cluster;
    determining weights associated with one or more dimensions of each vector generated for content items in a cluster; and
    generating a characteristic vector for the cluster based at least in part on the determined values and the determined weights.

6. The computer-implemented method of claim 1, wherein determining the measure of similarity between the candidate content item and one or more of the characteristic vectors comprises:
    generating a vector for the candidate content item based at least in part on one or more topics associated with the candidate content item, the vector for the candidate content item having one or more dimensions with a value of a dimension based at least in part on a number of times a topic occurs in the candidate content item; and
    determining a measure of similarity between the vector generated for the candidate content item and a characteristic vector based at least in part on values of one or more dimensions of the vector generated for the candidate content item and values of one or more dimensions of the characteristic vector.

7. The computer-implemented method of claim 1, wherein selecting the candidate content item for recommendation to the user based at least in part on the determined measures of similarity comprises:
- generating a ranking of a plurality of candidate content items based at least in part on measures of similarity between each of the candidate content items and one or more characteristic vectors; and
- selecting the candidate content item for recommendation if the candidate content item has at least a threshold position in the ranking.

8. The computer-implemented method of claim 1, wherein selecting the candidate content item for recommendation to the user based at least in part on the determined measures of similarity comprises:
- selecting the candidate content item if a measure of similarity between the candidate content item and at least one characteristic vector equals or exceeds a threshold value.

9. A computer-implemented method for recommending content items to a user of a digital magazine server, the method comprising:
- identifying a specific type of content item for recommending to the user of the digital magazine server;
- determining a time window corresponding to the identified specific type of content item, the duration of the time window determined based on a number of content items having the specific type included in a content store of the digital magazine server, different types of content item corresponding to time windows having different durations;
- identifying a plurality of content items with which the user of the digital magazine server previously interacted during the determined time window corresponding to the identified specific type of content item;
- generating a vector for each content item based at least in part on one or more topics determined from key terms included in a content item, the vector having one or more dimensions with a value of a dimension based at least in part on a number of times a topic occurs in the content item and the topics determined based on one or more characteristics describing frequency of presentation of each of the identified key terms in the content item and describing differences in presentation of each of the identified key terms by the content item relative to presentation of other terms in each content item;
- generating one or more clusters based at least in part on the generated vectors, each cluster including one or more content items;
- determining characteristic vectors for each cluster based at least in part on the generated vectors, a characteristic vector for a cluster based at least in part on one or more of the generated vectors included in the cluster;
- retrieving a plurality of candidate content items each having the identified specific type of content item; and
- selecting one or more candidate content items for presentation to the user based at least in part on a measure of similarity between each candidate content item and one or more of the characteristic vectors.

10. The computer-implemented method of claim 9, wherein identifying the plurality of content items with which the user of the digital magazine server previously interacted comprises:
- identifying a plurality of content items having at least a threshold number of connections to the user of the digital magazine server user via the digital magazine server.

11. The computer-implemented method of claim 9, wherein identifying the plurality of content items with which the user of the digital magazine server previously interacted comprises:
- identifying a plurality of content items having at least a threshold number of connections to additional content items with which the user of the digital magazine server previously interacted.

12. The computer-implemented method of claim 9, wherein generating the vector for each content item based at least in part on one or more topics determined from key terms included in a content item comprises:
- associating a weight with one or more dimensions of the vector based at least in part on a type of the content item for which the vector was generated.

13. The computer-implemented method of claim 9, wherein determining characteristic vectors for each cluster based at least in part on the generated vectors comprises:
- determining values associated with one or more dimensions of each vector generated for content items in a cluster;
- determining weights associated with one or more dimensions of each vector generated for content items in a cluster; and
- generating a characteristic vector for the cluster based at least in part on the determined values and the determined weights.

14. The computer-implemented method of claim 9, wherein selecting one or more candidate content items for presentation to the user based at least in part on the measure of similarity between each candidate content item and one or more of the characteristic vectors comprises:
- generating vectors for each of the candidate content items, a vector generated for a candidate content item based at least in part on one or more topics associated with the candidate content item and having one or more dimensions with a value of a dimension based at least in part on a number of times a topic occurs in the candidate content item;
- determining a measure of similarity between the vectors generated for each candidate content item and one or more characteristic vectors based at least in part on values of one or more dimensions of the vector generated for each candidate content item and values of one or more dimensions of the characteristic vectors;
- generating a ranking of the candidate content items based at least in part on the determined measures of similarity; and
- selecting one or more candidate content items based at least in part on the ranking.

15. The computer-implemented method of claim 14, wherein selecting one or more candidate content items based at least in part on the ranking comprises:
- selecting one or more content items having at least a threshold position in the ranking.

16. The computer-implemented method of claim 9, selecting one or more candidate content items for presentation to the user based at least in part on the measure of similarity between each candidate content item and one or more of the characteristic vectors comprises:
- selecting one or more candidate content items having at least a threshold measure of similarity between a candidate content item and at least one characteristic vector.

17. A computer-implemented method for recommending content items to a user of a digital magazine server, the method comprising:

identifying a specific type of content item for recommending to the user of the digital magazine server;

determining a time window corresponding to the identified specific type of content item, the duration of the time window determined based on a number of content items having the specific type included in a content store of the digital magazine server, different types of content item corresponding to time windows having different durations;

identifying a plurality of content items with which the user of the digital magazine server previously interacted during the determined time window corresponding to the identified specific type of content item;

identifying key terms from each of the plurality of content items;

generating one or more topics associated with each content item based at least in part on the identified key terms and characteristics describing frequency of presentation of each of the identified key terms in each content item and describing differences in presentation of each of the identified key terms by each content item relative to presentation of other terms in each content item;

generating a representation of each content item based at least in part on one or more topics associated with a content item, the representation of the content item having one or more dimensions with a value of a dimension based at least in part on a number of times a topic occurs in the content item;

generating one or more clusters each including one or more content items based at least in part on the generated representations;

determining characteristic representations for each cluster based at least in part on the generated representation, a characteristic representation for a cluster based at least in part on one or more of the generated representations included in the cluster;

retrieving a candidate content item having the specific type of content item;

determining a measure of similarity between the candidate content item and one or more of the characteristic representations; and selecting the candidate content item for recommendation to the user based at least in part on the determined measures of similarity.

* * * * *